(12) United States Patent
Vachhani

(10) Patent No.: US 8,594,693 B2
(45) Date of Patent: *Nov. 26, 2013

(54) METHOD FOR CONTROLLING ACCESS TO A MOBILE COMMUNICATIONS NETWORK

(75) Inventor: Ajay Vachhani, Bhopal (IN)

(73) Assignee: NEC Corporation, Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 12/812,404

(22) PCT Filed: Dec. 18, 2008

(86) PCT No.: PCT/JP2008/073679
§ 371 (c)(1),
(2), (4) Date: Jul. 9, 2010

(87) PCT Pub. No.: WO2009/090848
PCT Pub. Date: Jul. 23, 2009

(65) Prior Publication Data
US 2010/0279704 A1  Nov. 4, 2010

(30) Foreign Application Priority Data
Jan. 16, 2008  (GB) ................................. 0800767.6

(51) Int. Cl.
*H04W 72/04* (2009.01)
(52) U.S. Cl.
USPC .................... 455/453; 455/435.2; 455/436
(58) Field of Classification Search
USPC ............... 455/453, 435.2, 436, 179.1, 41.2; 370/328, 252, 352, 331
See application file for complete search history.

(56) References Cited

U.S. PATENT DOCUMENTS

| 6,438,379 | B1 | 8/2002 | Gitlin et al. | |
|---|---|---|---|---|
| 6,484,030 | B1 | 11/2002 | Antoine et al. | |
| 2007/0097939 | A1 | 5/2007 | Nylander et al. | |
| 2008/0219212 | A1* | 9/2008 | Kim | 370/331 |
| 2009/0075660 | A1* | 3/2009 | Hallenstal et al. | 455/437 |
| 2010/0103831 | A1* | 4/2010 | Caldwell et al. | 370/252 |
| 2011/0300842 | A1* | 12/2011 | Bjorken | 455/418 |

FOREIGN PATENT DOCUMENTS

| CN | 1146271 A | 3/1997 |
|---|---|---|
| CN | 1466399 A | 1/2004 |
| EP | 1 244 319 A2 | 9/2002 |
| GB | 2 382 269 A | 5/2003 |
| WO | 95/28813 | 10/1995 |
| WO | 98/46031 A2 | 10/1998 |

(Continued)

OTHER PUBLICATIONS

Chinese Office Action mailed Oct. 29, 2012 for corresponding Chinese patent application No. 200880124947.6.

*Primary Examiner* — Cong Tran
(74) *Attorney, Agent, or Firm* — Sughrue Mion, PLLC

(57) ABSTRACT

A method for redirecting communication requests made by user equipment (6,8) to an access point (2) in a cellular communication system is disclosed. The access point (2) has a shorter communication range than a macrocell in the system. The method comprises the steps of; sending a communication request from user equipment to the access point (2); determining whether the access point (2) has reached a maximum capacity; sending a communication rejection signal to the user equipment (6,8) if the access point (2) has reached maximum capacity; and redirecting the communication request into the macrocell in which the access point (2) is positioned wherein the macrocell and femtocell operate at the same frequency.

19 Claims, 3 Drawing Sheets

(56) References Cited

FOREIGN PATENT DOCUMENTS

| WO | 00/10355 A1 | 2/2000 |
| WO | 2005/064970 A1 | 7/2005 |
| WO | 2007/040449 A1 | 4/2007 |
| WO | 2007/040450 A1 | 4/2007 |
| WO | 2007/103062 A1 | 9/2007 |

* cited by examiner

Fig. 3

| INFORMATION ELEMENT | DESCRIPTION |
|---|---|
| FREQUENCY INFORMATION | |
| INTER-RAT INFORMATION | |
| GSM TARGET CELL INFORMATION | |
| UMTS TARGET CELL INFORMATION | |
|     PRIMARY CPICH INFORMATION | INTEGER (0 TO 511) |
|     UARFCN UPLINK | INTEGER (0 TO 16383) |
|     UARFCN DOWNLINK | INTEGER (0 TO 16383) |
| RETURN TO SOURCE CELL | BOOLEAN (1 OR 0) |

METHOD FOR CONTROLLING ACCESS TO A MOBILE COMMUNICATIONS NETWORK

TECHNICAL FIELD

This invention relates to controlling access to a mobile communications networks, in particular to a method for controlling access to a femtocell.

BACKGROUND ART

Mobile communication systems operate on a cellular basis in which transmission and receiver base stations coupled to a network provide transmission and reception to user equipment (UE) such as mobile telephones in each cell in a network. There is usually a single base station in each cell. The base stations are usually referred to as macro base stations and the cells as macrocells.

Smaller cell sites called picocells have been proposed. These cover a smaller area such as a complex of buildings. Still smaller cell sites called femtocells are also proposed. This is a term used by mobile operators to refer to cell sites of the type which attempt to solve the often expensive problem of providing complete in-building coverage where macrocells are often unable to provide adequate coverage due to attenuation and scattering of the radio signal from the base station.

A femtocell is often referred to as an access point base station or home gateway. It is a small plug and play device which communicates with user equipment such as mobile handsets using standard 2G or 3G transmission reception. It is connected to the cellular network via a broadband service using either Xdsl or WiMax technology. Xdsl is a family of technologies in which a digital subscriber loop allows broadband communications over conventional copper telephone lines, and WiMax, is a wireless Technology defined by the IEEE 802.16 standard providing improved wireless broadband compared to conventional Wi-Fi® systems. WiMax™ is a pending trade mark application of the WiMax Forum, California, USA and Wi-Fi® is a registered trade mark of the Wi-Fi® Alliance, California, USA.

A femtocell can optionally incorporate the functionality of a broadband router so that a user has a completely integrated device. It is of course essential that the femtocell integrates seamlessly with the core network of the mobile communication system so that it can be remotely managed and updated.

Femtocells are typically implemented using second generation (2G) and third generation (3G) wireless cellular networks. In Europe, one of the common 3G technologies, Universal Mobile Telecommunications System (UMTS), uses Wideband Code Division Multiple Access (W-CDMA) as the Radio Access Technology (RAT) to provide wireless communication. However, other RATs such as Code Division Multiple Access 2000 (CDMA 2000), Time Division Multiple Access (TD-CDMA), Universal Wireless Consortium (UWC), or Digital European Cordless Telecommunication (DECT) radio technologies may be used to implement 3-G networks.

In W-CDMA implemented 3G networks, there are two modes of data transmission; frequency division and time division. In the frequency division mode, communications between a mobile communication device and base station are provided in the frequency division mode by assigning one particular frequency for the uplink to the base station, and another frequency for the downlink from the base station to the mobile communication device. In this way, a mobile communication device is allocated part of the frequency spectrum for the entire duration of the communication. In the time division mode of operation, each user is allowed to transmit only for a length of time defined by an allocated slot, but is allowed to use the entire bandwidth of the channel for that transmission.

Femtocells generally provide wireless networks which typically cover small areas, such as residential environments, and as such they tend to offer limited bandwidth and therefore capacity in terms of the number of mobile communication devices that can simultaneously use the femtocell for wireless communication. The capacity of a femtocell to simultaneously handle voice calls may be as low as 4 voice calls at any one time. Consequently, as the number of mobile communication devices accessing or attempting to access the femtocell increases, there is a need to redirect devices from the femtocell to other neighbouring networks.

Known Third generation Partnership Project (3GPP) specifications provide a redirection feature mechanism for W-CDMA/UMTS.

The redirection feature allows a femtocell to transfer mobile communication devices which are using the femtocell for wireless communications to another cell operating under another RAT or to another frequency in the same 3G RAT.

DISCLOSURE OF INVENTION

However, current 3G redirection features do not allow for redirection of UE's from a first cell to another cell operating at the same frequency as the first cell. Therefore, if the 3G femtocell is operating at the same frequency as a neighbouring 3G RAT or macrocell, then the current redirection mechanism cannot be used for balancing the load. This is due to interference between cells.

A further problem with known redirection techniques is that once the mobile communication device is redirected to another RAT or to another cell at the same or different frequency as the femtocell, then its return to the original cell, the femtocell, is not controlled.

The invention is defined in the appended claims to which reference should now be made.

Embodiments of the invention have the advantage that for particular femtocells which have reached or are nearing full capacity, a UE such as a mobile telephone or mobile communication device (for example a laptop computer or other portable communication device) can be redirected from a 3G femtocell to another macrocell operating at the same or different frequency as the femtocell (access point).

This provides improved communications for existing users within the femtocell, as well as for new users whose communications have been redirected to another cell.

Preferably, it is advantageous that the device returns back to the original femtocell after completing its call or service with the macrocell which it was re-directed to, so that the macrocell can off load the UE's to the femtocell, thereby increasing the available bandwidth of the macrocell.

BRIEF DESCRIPTION OF DRAWINGS

An embodiment of the invention will now be described in detail, by way of example only, with reference to the accompanying drawings, in which:

FIG. 3 is a schematic diagram showing the location of the redirection information.

EXPLANATION OF REFERENCE

2 Access Point
4 Antenna
6 Mobile Phone
8 Laptop

BEST MODE FOR CARRYING OUT THE INVENTION

Although embodiments of the invention will be described with reference to W-CDMA, it is not in fact essential to use this technology, and other 3G technologies may be used instead. Furthermore, embodiments of the invention operate in both the Frequency Division (FDD) and Time Division (TDD) mode of operation.

Figure 1:
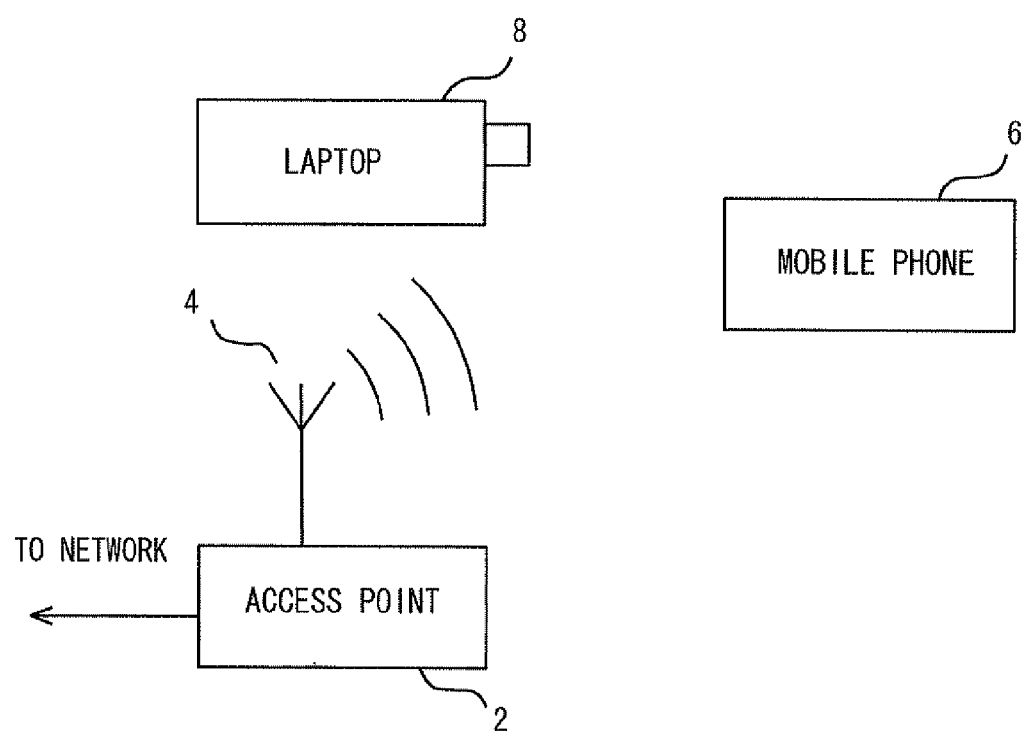
FIG. 1 shows schematically a 3G access point such as a femtocell in communication with a number of pieces of user equipment.

Referring to FIG. 1 of the drawings, this shows an access point 2 which is coupled to a network. This access point comprises an antenna 4 coupled to, or integrated into a controller and a transmit/receive unit. In the case of a femtocell, this will cover a relatively small area such as a building or house or small office.

The area covered by the femtocell is usually co-located with the area covered by the macrocell. That is to say that the two cells neighbour each other or the two cells overlap with each other to some degree or the femtocell is contained within the macrocell.

Furthermore, unlike two conventional co-located marcocells, it is possible for the femtocell to be deployed at the same frequency as a macrocell which is co-located with the femtocell.

This is possible because the femtocell is provided with a low power transmitter/receiver, and also because the femtocell operates in an in-door environment so that its coverage is largely restricted to inside the building within which it is deployed. Typically femtocell transmitter/receivers have a power of +10 decibel meters (dBm). In this way the radio signal transmitted by the femtocell is substantially contained within the building in which it is deployed due to attenuation and scattering of the radio signal transmitted by the femtocell.

The quality of the signal transmitted by the macrocell within the femtocell (for example inside a building which is covered by the femtocell) is not particularly good, due to scattering and attenuation of the signal by the building. However it is of sufficient quality to make a call or make data communications and for the femtocell to redirect the UEs to the macrocell.

Therefore there is minimal, but acceptable, interference of the femtocell with a co-located macrocell, and sufficient reception quality of the macrocell within the femtocell to allow both redirection and communication with the macrocell.

User Equipment such as a mobile phone 6 or a laptop 8 with a data card may be within the building or house and therefore capable of communication with the access point 2. In a larger area such as an office environment there may be a number of different pieces of equipment capable of communicating with the access point 2. When a piece of user equipment initially comes into range of the access point 2, it registers with the access point 2 as being a primary access point on the network for transmission and reception of data. Thus, when the user equipment next tries to communicate such as by making a telephone call, it will attempt to use the access point 2 to access the network.

The access point 2 is connected to the network, typically using a conventional telephone line with a broadband connection using one of the technologies from the xdsl family, for example Asymmetric Digital Subscriber Line (ADSL). As the access point 2 is designed for residential coverage, the total bandwidth, that is to say the capacity of the access point 2 to serve multiple simultaneous voice or/and data calls, that it is capable of supporting is considerably less than that of a base station in a macrocell in the network. This is because the access point is designed to take communications from a localised area within a macrocell and is not designed to handle the requirements of the whole macrocell. If the access point is a home gateway device, the maximum number of communications that it can handle simultaneously may be as little as 4. In other words, it can only handle 4 simultaneous voice calls or/and data transmissions from different mobile telephones all registered with the access point. When the maximum number of possible devices using the access point is reached and another piece of user equipment or subscriber places a request to communicate via the access point 2, the access point 2 then has to reject the request. This means that the subscriber cannot use the service.

In order to deal with this situation, the access point is configured to redirect a piece of user equipment which has had its request rejected to use the macrocell within which the access point is positioned.

Figure 2:
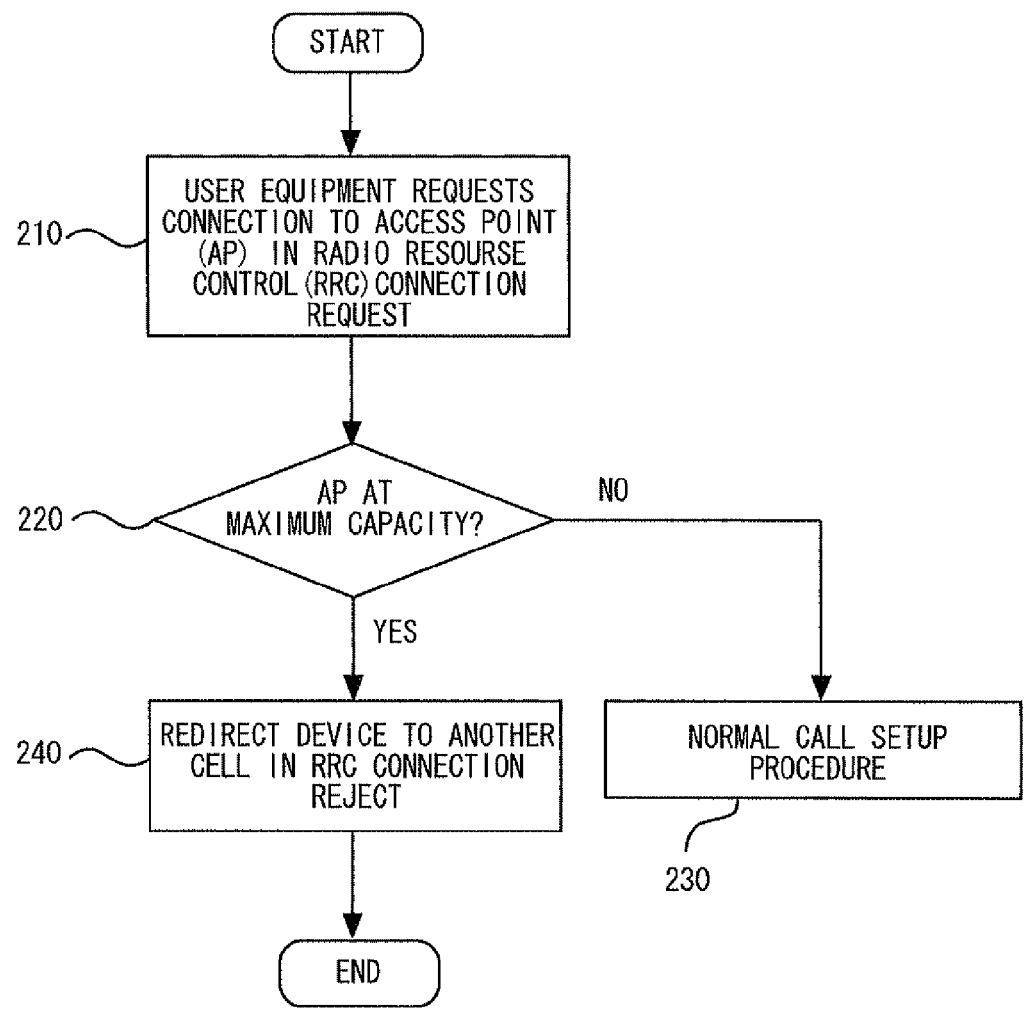
FIG. 2 shows a flow diagram of the main steps performed by an embodiment of the invention.

A flow diagram showing communications between a piece of user equipment and an access point 2 is shown in FIG. 2. This assumes that the user equipment is already registered with the access point and will attempt to use this for its communications.

When the user equipment wishes to make a communication such as a voice call via an access point, it first sends a radio resource control (RRC) connection request to the access point 2, step 210. The access point and the user equipment then perform an RRC connection set up which will initially establish this contact between the user equipment and the access point. A determination is then made at 220 as to whether or not the access point has reached maximum capacity. The access point does this by checking the available resources. If all the bandwidth has been used up then maximum capacity is reached. If maximum capacity has not been reached, then the normal call set up procedure between the user equipment and the access point is performed at step 230. This does not form the subject matter of the present invention and is therefore not described here, however it will be well known to those skilled in the art.

On the other hand, if it is determined at 220 that the access point has reached maximum capacity, then the access point balances the load of the femtocell.

Load balancing is achieved in a number of ways. Firstly, the femtocell can reject the new user request for service. However, this of course means that the UE cannot be provided with wireless communication.

Alternatively, the femtocell can redirect or transfer the UE attempting to access the femtocell to a macrocell when the femtocell cannot accept any other UE's for communication since it has reached its maximum bandwidth.

This is achieved by the access point sending a RRC Connection Reject message to the UE. The Connection Reject message contains redirection information which allows a UE to be redirected to a macrocell operating at the same or different frequency as the femtocell when the maximum desired capacity has been reached, step 240, therefore balancing the load of the femtocell.

It is the femtocell determines to which macrocell a UE should be redirected or transferred. When the femtocell is first switched on, it behaves like a mobile device (UE) and performs a cell search to determine the presence of surrounding neighbouring cells. If the femtocell determines that there is more than one macrocell available, then the femtocell (access point) selects the macrocell with the stronger signal as the macrocell to which it should redirect UE's. This also means that the femtocell can determine that the macrocell with a stronger signal is the closer macrocell, and hence the cell to which UE's should be redirected. If on the other hand, the femtocell determines that there is only one available macrocell, then it will redirect UE's to this macrocell.

A schematic diagram of the information contained in the redirection information is shown in FIG. 3.

When the UE receives a Connection Rejection Message, it locates the redirection information then finds the "UMTS target cell" information, which is a group of parameters that enable redirection to another macrocell operating at the same or different frequency as the femtocell.

The UE first reads the Primary Common Pilot Channel (CPICH) information value within the UMTS target cell information. This is defined by an integer from 0 to 511. Once the UE has the CPICH information, this allows it to identify the scrambling code used by the UMTS target cell. The primary scrambling code, along with the target cell like frequency (UARFCN) are used to differentiate between base stations and define each particular cell.

In particular, the UE reads UARFCN uplink and UARFCN downlink values in the UMTS target cell information and these parameters, each defined by an integer from 0 to 16383, define the frequencies of the uplink and downlink communications.

In this way, redirection of the UE from the femtocell occurs soon after the UE receives the RRC Connection Reject message from the femtocell. It does not wait until the UE moves outside the femtocell.

This allows the normal call set up procedure between the UE and the target cell to be performed. These steps do not form the subject matter of the present invention and is therefore not described here, however it will be well known to those skilled in the art.

Preferably, another new parameter is included in the redirection information, which is a "Return to Source Cell" parameter. The Return to Source Cell parameter is not part of UMTS Target Cell Information hence it is shown in FIG. 3 at a different indentation level to that of the UMTS target cell information.

If this parameter is set to "True" then the mobile device remembers the Source Cell configuration and after releasing the call (in the procedure Cell selection after connect mode) it redirects the device to the source cell, after the user has finished communicating with the cell. This allows the UE to remember the source cell configuration, so that after the call or data transfer with the target cell has been completed, the UE is returned to the femtocell. In this way, the UE can rejoin the femtocell, so that they can take advantage of cheap calls via the femtocell, provided that the femtocell is not at maximum capacity, otherwise the UE will be redirected to another cell as previously described. This redirecting of the UE back to the femtocell also has the advantage of offloading users to the femtocell, which allows the macrocell to increase its available bandwidth because UE's are transferred to the femtocell, making more bandwidth available to the macrocell.

The new parameter "Return to Source Cell" can be included in embodiments of the invention in which the femtocell (access point) is operating at the same frequency as the macrocell or in which the femtocell is operating at a different frequency as the macrocell. In this way, the communication request or communication reject signal or both comprise information identifying the access point from which the user equipment was redirected. Then the user equipment is redirected back to the access point (femtocell) when the user equipment has finished communicating with the macrocell, that is to say, when it has finished a call or service. This allows a user to take advantage of low-priced connection with the femtocell, which is often available, whilst also off-loading a UE from the macrocell to a femtocell, thereby providing additional bandwidth available for other users.

Embodiments of the invention which redirect UE's from a femtocell to a macrocell operating at the same frequency provide an improved mechanism for redirecting to another cell over conventional known redirect mechanisms which redirect to a different frequency. This is because, in many cases, it is desirable to be able to provide 3G networks in which only one frequency is available for use in each cell. This allows the available bandwidth to be partitioned among more operators, therefore allowing more networks of different operators to be provided in one area. Furthermore, since each 3G-frequency license costs billions of pounds many small operators will only have one frequency available with which they can deploy the macrocells and femtocells. Therefore the present invention provides an improved redirection mechanism which provide load balancing of the femtocells when the femtocell is deployed in the same frequency as the macro cell, and when only one frequency is provided per cell, whilst still allowing the UE to communicate with the macrocell, Embodiments of the invention also have the advantage that they do not take as long to search and camp on to the macrocell as conventional redirection mechanisms, since the same frequency is used. Known redirection mechanisms must use a different frequency, which must first be searched for and then camped on to.

Therefore, even if it is possible to redirect UE to a macrocell operating at a different frequency than the femtocell, it is preferable to use the present invention and redirect the UE to a macrocell operating at the same frequency as the femtocell. Embodiments of the invention provide an improved redirection facility in which redirection to a femtocell co-located with a macrocell is possible in all cases even when the femtocell and macrocell operate at a different or the same frequency.

Although embodiments of the invention have been described with reference to W-CDMA/UMTS, it will be appreciated by those skilled in the art that it is equally applicable to other 3G technologies.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from British patent application No. 0800767.6, filed on Jan. 16, 2008, the disclosure of which is incorporated herein in its entirety by reference.

INDUSTRIAL APPLICABILITY

The present invention provides a method for controlling access to a mobile communications networks.

The invention claimed is:

1. A method for redirecting communication requests made by user equipment to an access point in a cellular communication system wherein the access point of a femtocell has a shorter communication range than the access point of a macrocell in the system, the method comprising;
   (a) sending a communication request from user equipment to the access point of the femtocell;
   (b) determining whether the access point of the femtocell has reached a maximum capacity;
   (c) sending a communication rejection signal to the user equipment if the access point of the femtocell has reached maximum capacity; and
   (d) redirecting the communication request into the access point of the macrocell in which the access point is positioned wherein the macrocell and femtocell operate at the same frequency,
   wherein the access point comprises a low-power femtocell transmitter or/and receiver.

2. The method for redirecting communication requests according to claim 1 in which one or more of the communication request or communication reject signal(s) comprises a radio resource control connection message.

3. The method for redirecting communication requests according to claim 2 in which the radio resource control connection message further comprises information identifying the access point from which the user equipment was redirected, and in which the user equipment is redirected back to the access point when the user equipment is released from communication with the macrocell.

4. The method for redirecting communication requests according to claim 1 in which the femtocell transmitter or/and receiver has a power of approximately 10-decibel meters.

5. The method for redirecting communication requests according to claim 1 in which the user equipment is only redirected to the macrocell if the access point has reached maximum capacity.

6. A non-transitory computer readable medium that stores a program for redirecting communication requests, said program comprising program code adapted to perform the method of claim 1 when said program is executed.

7. A method for redirecting communication requests made by user equipment to an access point in a cellular communication system wherein the access point of a femtocell has a shorter communication range than the access point of a macrocell in the system, the method comprising;
   (a) sending a communication request from user equipment to the access point of the femtocell;
   (b) determining whether the access point of the femtocell has reached a maximum capacity;
   (c) sending a communication rejection signal to the user equipment if the access point of the femtocell has reached maximum capacity; and
   (d) redirecting the communication request into the access point of the macrocell in which the access point is positioned wherein the communication request or communication reject signal or both comprise information identifying the access point from which the user equipment was redirected, and in which the user equipment is redirected back to the access point when the user equipment is released from communication with the macrocell.

8. The method for redirecting communication requests according to claim 7 in which one or more of the communication request or communication reject signal(s) comprises a radio resource control connection message.

9. The method for redirecting communication requests according to claim 7 in which the user equipment is redirected to a macrocell operating at the same frequency as the access point.

10. An access point in a cellular communication system for redirecting communication requests made by a user equipment wherein the access point of a femtocell has a shorter communication range than the access point of a macrocell in the system, the access point comprising:
    a unit that determines whether the access point of the femtocell has reached a maximum capacity; and
    a unit that sends a communication rejection signal to the user equipment if the access point of the femtocell has reached maximum capacity,
    wherein the communication rejection signal includes information identifying a macrocell, and the femtocell is positioned in which the macrocell and femtocell operate at the same frequency.

11. The access point according to claim 10 further comprising a unit that determines the availability of one or more macrocells whose coverage overlaps with that of the access point and which operates at the same frequency as the access point.

12. The access point according to claim 11 in which the rejection signal includes the information identifying the macrocell which has the strongest reception level.

13. Apparatus for redirecting communication requests made by user equipment to an access point in a cellular communication system wherein the access point of a femtocell has a shorter communication range than the access point of a macrocell in the system, the apparatus comprising;
    a unit that sends a communication request from user equipment to the access point of the femtocell;
    a unit that determines whether the access point of the femtocell has reached a maximum capacity;
    a unit that sends a communication rejection signal to the user equipment if the access point of the femtocell has reached maximum capacity; and
    a unit that redirects the communication request into the access point of the macrocell in which the access point is positioned wherein the macrocell and femtocell operate at the same frequency,
    wherein the access point comprises a low power femtocell transmitter or/and receiver.

14. The apparatus for redirecting communication requests according to claim 13 in which one or more of the communication request or communication reject signal comprises a radio resource control connection message.

15. The apparatus method for redirecting communication requests according to claim 13 in which the femtocell transmitter or/and receiver has a power of approximately 10 decibel meters.

16. The apparatus for redirecting communication requests according to claim 13 in which the user equipment is only redirected to the macrocell if the access point has reached maximum capacity.

17. Apparatus for redirecting communication requests made by user equipment to an access point in a cellular communication system wherein the access point of a femtocell has a shorter communication range than the access point of a macrocell in the system, the apparatus comprising the steps of;
    a unit that sends a communication request from user equipment to the access point of the femtocell;
    a unit that determines whether the access point of the femtocell has reached a maximum capacity;

a unit that sends a communication rejection signal to the user equipment if the access point of the femtocell has reached maximum capacity; and a unit that redirects the communication request into the access point of the macrocell in which the access point is positioned wherein the communication request or communication reject signal or both comprise information identifying the access point from which the user equipment was redirected, and in which the user equipment is redirected back to the access point when the user equipment is released from communication with the macrocell.

18. The apparatus for redirecting communication requests according to claim 17 in which the user equipment is redirected to a macrocell operating at the same frequency as the access point.

19. The apparatus for redirecting communication requests according to claim 14 in which the radio resource control connection message further comprises information identifying the access point from which the user equipment was redirected, and in which the user equipment is redirected back to the access point when the user equipment has finished a call or service with the macrocell.

* * * * *